United States Patent
Glafenhein (10) Patent No.: US 11,680,643 B2
(45) Date of Patent: Jun. 20, 2023

(54) NONCONTACTING INTERSHAFT SEAL SYSTEM

(71) Applicant: HONEYWELL INTERNATIONAL INC., Charlotte, NC (US)

(72) Inventor: Aaron G. Glafenhein, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 13 days.

(21) Appl. No.: 17/304,762

(22) Filed: Jun. 25, 2021

(65) Prior Publication Data

US 2022/0412462 A1     Dec. 29, 2022

(51) Int. Cl.
*F16J 15/324* (2016.01)
*F01D 11/00* (2006.01)

(52) U.S. Cl.
CPC .......... *F16J 15/324* (2013.01); *F01D 11/00* (2013.01)

(58) Field of Classification Search
CPC .... F16J 15/00; F16J 15/26; F16J 15/28; F16J 15/324; F16J 15/3244; F01D 11/00; F01D 11/02
USPC ........................................................ 277/411
See application file for complete search history.

(56) References Cited

U.S. PATENT DOCUMENTS

| | | | |
|---|---|---|---|
| 8,038,155 B2 * | 10/2011 | Zheng | F16J 15/3444 |
| | | | 277/400 |
| 8,100,403 B2 | 1/2012 | Short | |
| 8,408,555 B2 * | 4/2013 | Garrison | F01D 11/00 |
| | | | 277/306 |
| 8,474,826 B2 * | 7/2013 | Villeneuve | F16J 15/3444 |
| | | | 277/377 |
| 8,820,752 B2 | 9/2014 | Garrison et al. | |
| 8,899,593 B2 | 12/2014 | Jahn et al. | |
| 8,967,627 B2 | 3/2015 | Jahn et al. | |
| 10,228,061 B2 | 3/2019 | Pekris et al. | |
| 10,520,096 B2 | 12/2019 | Munson | |
| 10,948,014 B2 | 3/2021 | Garrison | |
| 2014/0347152 A1 | 11/2014 | Aronstam et al. | |
| 2017/0248026 A1 | 8/2017 | De La Bruere Terreault | |
| 2018/0180185 A1 * | 6/2018 | Munson | F16J 15/4476 |
| 2019/0226585 A1 | 7/2019 | Snow et al. | |

FOREIGN PATENT DOCUMENTS

| | | |
|---|---|---|
| FR | 2602847 A1 | 2/1988 |
| WO | 2020014123 A1 | 1/2020 |

* cited by examiner

*Primary Examiner* — Nathan Cumar
(74) *Attorney, Agent, or Firm* — Lorenz & Kopf, LLP (57) ABSTRACT

A noncontacting intershaft seal system includes force generating mechanisms to reduce contact related effects. A sealing system includes an outer shaft that has a hollow interior. An inner shaft extends through the hollow interior of the outer shaft. Spaced apart end plates encircle and rotate with the inner shaft. A gland opening is defined between the inner and outer shafts and between the end plates. A ring is disposed in the gland opening. The end plates and/or the ring include force generating elements that generate force to separate the ring from the end plates, reducing contact related heat generation and wear.

20 Claims, 7 Drawing Sheets

NONCONTACTING INTERSHAFT SEAL SYSTEM

TECHNICAL FIELD

The present invention generally relates to sealing in rotating machinery, and more particularly relates to a seal system that provides sealing between two shafts that rotate relative to one another, while minimizing contact related effects.

BACKGROUND

Various types of machines include rotating parts that operate in an environment where different internal areas are preferably sealed relative to one another. Machinery such as turbomachines, including gas turbine engines, may include rotating components such as a fan, a compressor, and a turbine. Rotor shafts may connect the rotating components, forming a rotor group or spool. Various sealing apparatus are used in the rotating equipment, such as to retain oil within lubricated compartments, to prevent oil from entering unwanted areas, and/or to separate different pressurized areas. Some of the parts may rotate at very high speeds, and other machine operating states may subject the seals to extreme environmental conditions.

Some turbomachines include two or more coaxial rotor shafts, for example a high pressure turbine (HPT) shaft and a low pressure turbine (LPT) shaft. Various areas within turbomachines may include oil, which is preferably maintained in its intended spaces by the seals. When the faces of these seals are loaded, such as due to differential pressures within the machine, undesirable effects such as heat and wear may be generated. Providing effective sealing becomes more challenging when the operational bandwidth of machines is extended, which may produce more extreme conditions.

Accordingly, it is desirable to provide systems that provide effective sealing between different internal areas of a machine with rotating parts, while delivering improved performance characteristics. Furthermore, other desirable features and characteristics of the present invention will become apparent from the subsequent detailed description of the invention and the appended claims, taken in conjunction with the accompanying drawings and this background of the invention.

BRIEF SUMMARY

This brief summary is provided to describe select concepts in a simplified form that are further described in the Detailed Description section. This summary is not intended to identify key or essential features of the claimed subject matter, nor is it intended to be used as an aid in determining the scope of the claimed subject matter.

Noncontacting intershaft seal systems as disclosed herein, may include force generating mechanisms to reduce unwanted contact related effects. In a number of embodiments, a sealing system includes an outer shaft that has a hollow interior. An inner shaft extends through the hollow interior of the outer shaft. Spaced apart end plates encircle and rotate with the inner shaft. A gland opening is defined between the inner and outer shafts and between the end plates. A ring is disposed in the gland opening. The end plates include force generating elements that generate desirable forces to separate the ring from the end plates, reducing contact related heat generation and wear.

In a number of additional embodiments, a sealing system includes an outer shaft having a hollow interior. An inner shaft extends through the hollow interior of the outer shaft. One end plate encircles the inner shaft and rotates with the inner shaft within the hollow interior. Another end plate encircles the inner shaft and rotates with the inner shaft within the hollow interior. A spacer encircles the inner shaft and axially spaces the end plates. A gland opening is defined in an area between the inner and outer shafts and between the end plates. A split ring is disposed in the gland opening and operates to expand during rotation to engage and rotate with the outer shaft. The end plates include force generating elements that generate forces acting to separate the split ring from the end plates.

In a number of other embodiments, a sealing system includes an outer shaft having a hollow interior. An inner shaft extends through the hollow interior of the outer shafts. The inner and the outer shafts rotate relative to one another. A pair of end plates encircle the inner shaft and rotate with the inner shaft within the hollow interior. A spacer encircles the inner shaft and axially spaces the end plates. A gland opening is defined between the inner and outer shafts and between the end plates. A split ring is disposed in the gland opening and is configured to expand in response to rotationally generated forces to engage and rotate with the outer shaft. The split ring is not fixed to the outer shaft. The end plates include force generating magnets configured to generate forces acting to separate the split ring from the end plates. The split ring includes a series of magnets configured to repel both of the force generating magnets. The split ring comprises a low friction material, including in areas disposed between the series of magnets and the end plates. The end plates each include a section of material that is disposed between the force generating magnets and the split ring. The areas of low friction material and the sections of material separate the magnetic elements from adjacent components.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, a system provides sealing between relatively rotating shafts while minimizing the effects of contact between parts. For example, a sealing system includes an inner shaft extending through the hollow interior of an outer shaft. Axially spaced plates between the shafts define a gland opening. A ring, which may be split and not fixed to either shaft, is disposed in the gland opening. The ring may be configured to expand under the effects of rotation to engage and rotate with the outer shaft. One or both of the plates may include force generating elements, such as magnetic elements and/or hydrodynamic elements, to generate forces that act to keep the ring separated from the plates during operationally induced axial excursions of the shafts. Maintaining separation may reduce heat generation and wear leading to longer service lives and other desirable outcomes. For example, if contact does occur, the resulting heat generated and parasitic loss will be minimized. As a result, higher operating speeds and maximum pressures may be achieved that would otherwise be impractical.

In the examples given herein, a noncontacting intershaft seal system is described in association with an aircraft gas turbine engine, but the disclosure is not limited in utility to such applications. In the example of a gas turbine engine, the environment is challenging with pressure loadings potentially leading to wear and service life limitations. Accordingly, a noncontacting seal system is useful to reduce wear and extend service life. The current disclosure is applicable to other applications when noncontacting seal systems are also useful in rotating structures, including in high temperature environments. So, although described in the aircraft context, various features and characteristics disclosed herein may be used in other contexts and applications where a noncontacting seal system is useful, including intershaft applications. For example, various other engine environments, as well as different types of rotating machinery will benefit from the features described herein. Thus, no particular feature or characteristic is constrained to an aircraft or a gas turbine engine, and the principles are equally embodied in other vehicles, or in other equipment, and in other applications.

Figure 1:
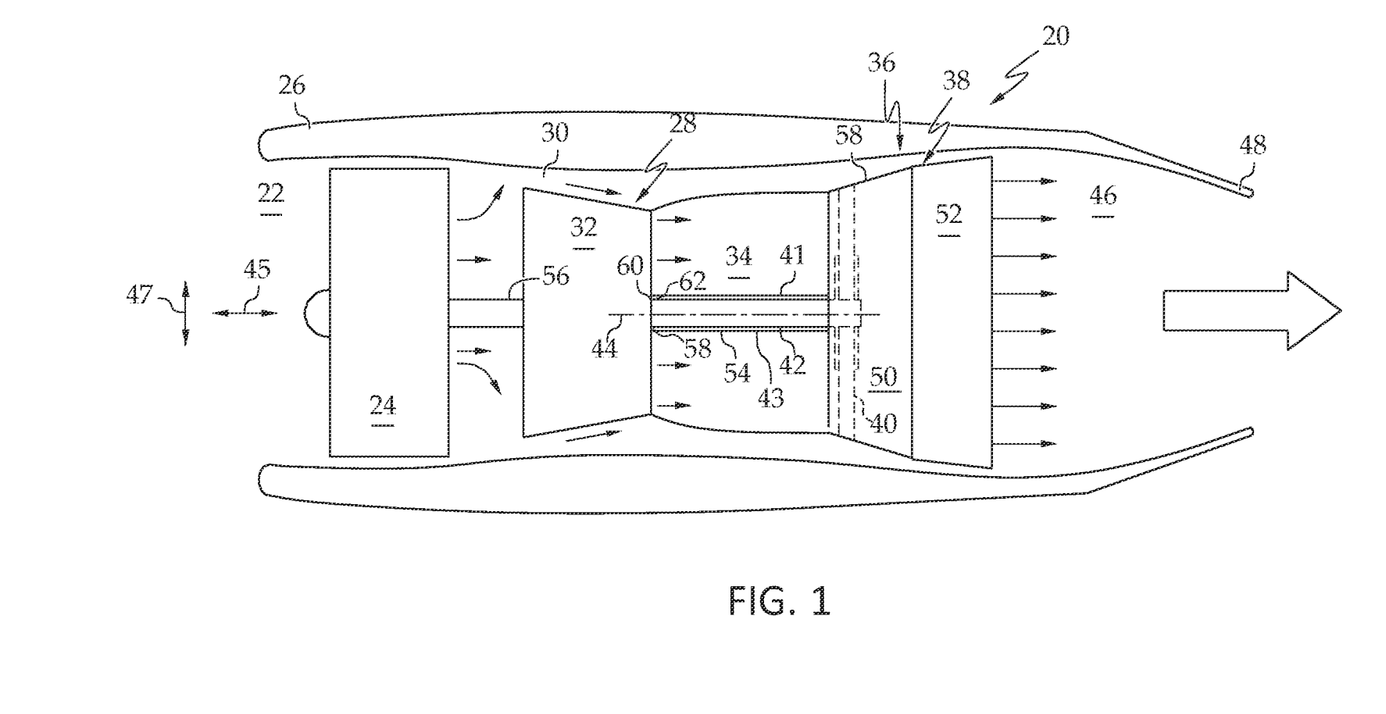
FIG. 1 is a schematic, cross-sectional illustration of a gas turbine engine, according to an exemplary embodiment.

As noted above, the noncontacting seal systems described herein may be employed in a variety of applications. By way of an exemplary embodiment as illustrated in FIG. 1, an engine 20 is configured as a gas turbine engine for aircraft propulsion. The engine 20 includes an intake 22, with a fan section 24 disposed in a fan case 26. The fan section 24 draws air into the engine 20 and accelerates it. The air is directed through plural paths, such as one to the engine core 28, and another through a bypass duct 30. A compressor section 32 compresses the air delivered to the engine core 28 and sends it to a combustion section 34. In the combustion section 34 the air is mixed with fuel and ignited for combustion. Combustion air is directed into a turbine section 36. The hot, high-speed air flows within the turbine case 38 and over the turbine blades 40 which spin on shafts 41, 42 about an axis 44. The air from the turbine section 36 rejoins that from the bypass duct 30 and is discharged through an exhaust section 46 including through a propulsion nozzle 48.

The axis 44 defines an axial direction 45, with a radial direction 47 projecting from the axis 44 and normal thereto. One of both of the shafts 41, 42 may rotate, and each may rotate in either direction relative to the other. The shaft 41 has a hollow interior and is configured as an outer shaft, with the shaft 42 extending through the hollow interior and configured as an inner shaft. The shafts 41, 42 are rotatable relative to one another and as result, the shafts 41, 42 define a gap 43 between them.

The turbine section 36 includes one or more turbines. In the depicted embodiment, the turbine section 36 includes two turbines, a high-pressure turbine 50, and a low-pressure turbine 52. However, it will be appreciated that the engine 20 may be configured with a different number of turbines. As the rotors of the turbines 50, 52 rotate, they drive equipment in the engine 20 via the concentrically disposed shafts 41, 42 and are configured as spools. Specifically, the high-pressure turbine 50 may drive the compressor section 32 via a high-pressure spool 54 including the shaft 41, and the low-pressure turbine 52 may drive the fan section 32 via a low-pressure spool 56 including the shaft 42. In the case of the low-pressure turbine 52, the rotor is omitted for simplicity.

The gap 43 may contain a number of seal assemblies, including, for example, seal assembly 58. The seal assembly 58 seals an area 60 of a gas such as air from an area 62 that may be lubricated and may contain a gas such as air with some oil content. The areas 60, 62 may have pressure fluctuations, and may be at different pressure levels from one another. With additional reference to FIG. 2, an area around the seal assembly 58 is schematically illustrated and is removed from the engine 20 for clarity. The shaft 41 is disposed along the axis 44 around which it may rotate. The shaft 41 includes an inner wall 68 defining a hollow interior 70. The shaft 42 is also disposed on the axis 44 around which it may rotate. The shaft 42 extends through the hollow interior 70 defining the gap 43 as an elongated annular space between the shafts 41, 42. The seal assembly 58 is disposed in the gap 43 to seal the area 62 from the area 60. In a number of embodiments, the area 60 is adjacent the compressor section 32 and so may generally be at higher pressures than the area 62.

Figure 2:
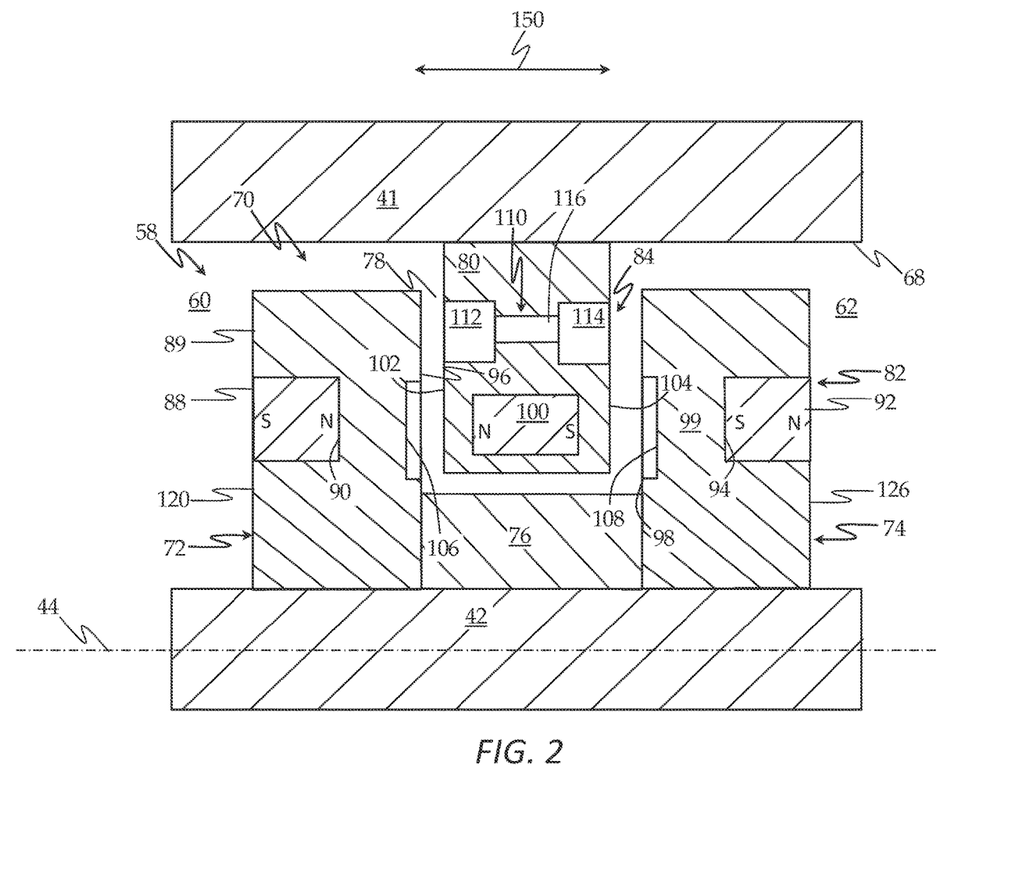
FIG. 2 is a schematic, cross-sectional illustration a sealing system of the gas turbine engine of FIG. 1, according to an exemplary embodiment.

In general, the seal assembly 58 includes an end plate 72 adjacent the area 60, and an end plate 74 adjacent the area 62. The end plate 74 is spaced from the end plate 72 by a spacer 76 defining a gland opening 78. A ring, designated as split ring 80, is disposed in the gland opening 78. The end plates 72, 74 and the spacer 76 are disposed to move, if at all, with the shaft 42. For example, they may be press-fit and/or keyed onto, or otherwise fixed to the shaft 42 to rotate therewith. The end plates 72, 74 and the spacer 76 may be made of a nonmagnetic material such as a nickel-chromium alloy. The split ring 80 is not fixed to either the shaft 41 or the shaft 42, and is expandable under rotationally induced centrifugal forces to frictionally engage the shaft 41 to rotate therewith. The split ring 80 may be made of a low friction material such as a carbon containing material. Preferably, the split ring 80 is maintained in the gland opening 78 between the end rings 72, 74, without contacting either of the end rings 72, 74 during operation of the engine 20.

It has been found that contact during high speed relative rotation of the shafts 41, 42 may lead to heat and wear that if significant enough, may result in reduced service life. For example, translation of the shafts 41, 42 relative to one another along the axis 44 during axial excursions may occur as a result of operation variations of the engine 20, such as pressure fluctuations. If compensation is not provided, such as through the features of the seal assembly 58, rub between the various plates/rings as measured by a pressure velocity factor, may be undesirably high. The pressure-velocity limit for a seal is the highest combination of pressure and velocity at which that seal operates with normal wear. Beyond the pressure-velocity limit, the seal may experience an undesirable amount of wear due to a high level of rub. Accordingly, the seal assembly 58 has a number of features to reduce or avoid rub and to maintain operation below the pressure-velocity limit. As a result, the pressure-velocity limit may be extended for broadening the operational range of the engine 20.

Figure 3:
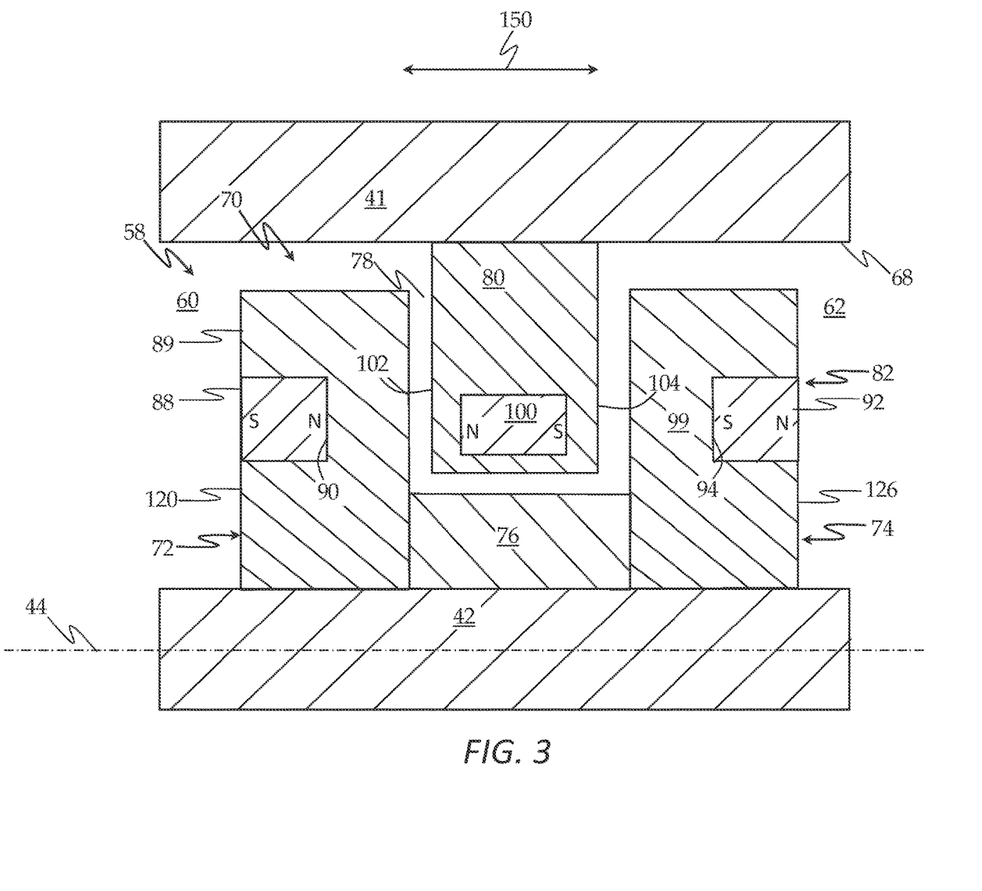
FIG. 3 is a schematic, cross-sectional illustration an alternate sealing system for the gas turbine engine of FIG. 1, according to an exemplary embodiment.

In a number of embodiments, the seal assembly 58 is configured to induce forces to offset the forces that drive axial excursions of the shafts 41, 42 relative to one another. For example, the seal assembly 58 may include a magnetic system 82 to generate offsetting forces. Also for example, the seal assembly 58 may include a hydrodynamic system 84 to generate offsetting forces. In a number of embodiments, the seal assembly 58 may include only one of the systems (magnetic system 82 or hydrodynamic system 84). For example, the seal assembly 58 is illustrated in FIG. 3 with only the magnetic system 82. In other embodiments, the seal assembly 58 may include both of the systems (magnetic system 82 and hydrodynamic system 84), as illustrated in FIG. 2.

In the magnetic system 82, a magnetic ring 88 is contained in an annular groove 90 of the end plate 72 and a magnetic ring 92 is contained in an annular groove 94 of the end plate 74. The magnetic ring 88 is spaced away from the gland opening 78 by a section 89 so that the material of the end plate 72 defines the surface 96 facing the split ring 80, preventing any potential for contact between the magnetic ring 88 and the split ring 80. The magnetic ring 92 is also spaced away from the gland opening 78 by a section 99 so that the material of the end plate 74 defines the surface 98 facing the split ring 80 preventing any potential for contact between the magnetic ring 92 and the split ring 80. The split ring 80 carries at least one magnet 100, which may be a series of magnets 100. The base material of the split ring 80, which may be a low friction material, defines the surface 102 facing the end plate 72 preventing any potential for contact between the magnet(s) 100 and the end plate 72. Similarly, the base material of the split ring 80 defines the surface 104 facing the end plate 74 preventing any potential for contact between the magnet(s) 100 and the end plate 74. As a result, an area of the low friction base material is disposed between the magnet(s) 100 and the end plates 72, 74. The magnetic system 82 is configured with magnetic poles so that the magnetic ring 88 and the magnet(s) 100 repel each other along the axis 44 and so that the magnet(s) 100 and the magnetic ring 92 also repel each other along the axis 44. The effect is to act to center the split ring 80 within the gland opening 78.

In the hydrodynamic system 84, the end plate 72 includes a series of grooves 106 configured to pump fluid generating pressures/forces to maintain separation between the surfaces 96, 102. Similarly, the end plate 74 includes a series of grooves 108 configured to pump fluid to maintain separation between the surfaces 98, 104. During relative rotation between the shafts 41, 42, the generated hydrodynamic forces offset those forces that operate to drive axial excursions, including those that would otherwise result in contact between relatively rotating parts.

A pressure balancing system 110 is formed in the split ring 80. The pressure balancing system 110 includes an annulus 112 formed through the surface 102 and defines an annular grove around the side of the split ring 80 facing the end plate 72. Similarly, an annulus 114 is formed through the surface 104 and defines an annular groove around the side of the split ring 80 facing the end plate 74. The pressure balancing system 110 includes at least one opening 116, which may be a series of openings formed axially through the split ring 80 providing a path for pressure communication between the annulus 112 and the annulus 114. The annuli 112, 114 beneficially provide open areas around the entire circumference of the split ring 80, while the openings 116 provide cross communication with minimal material removal.

Figures 4, 5:
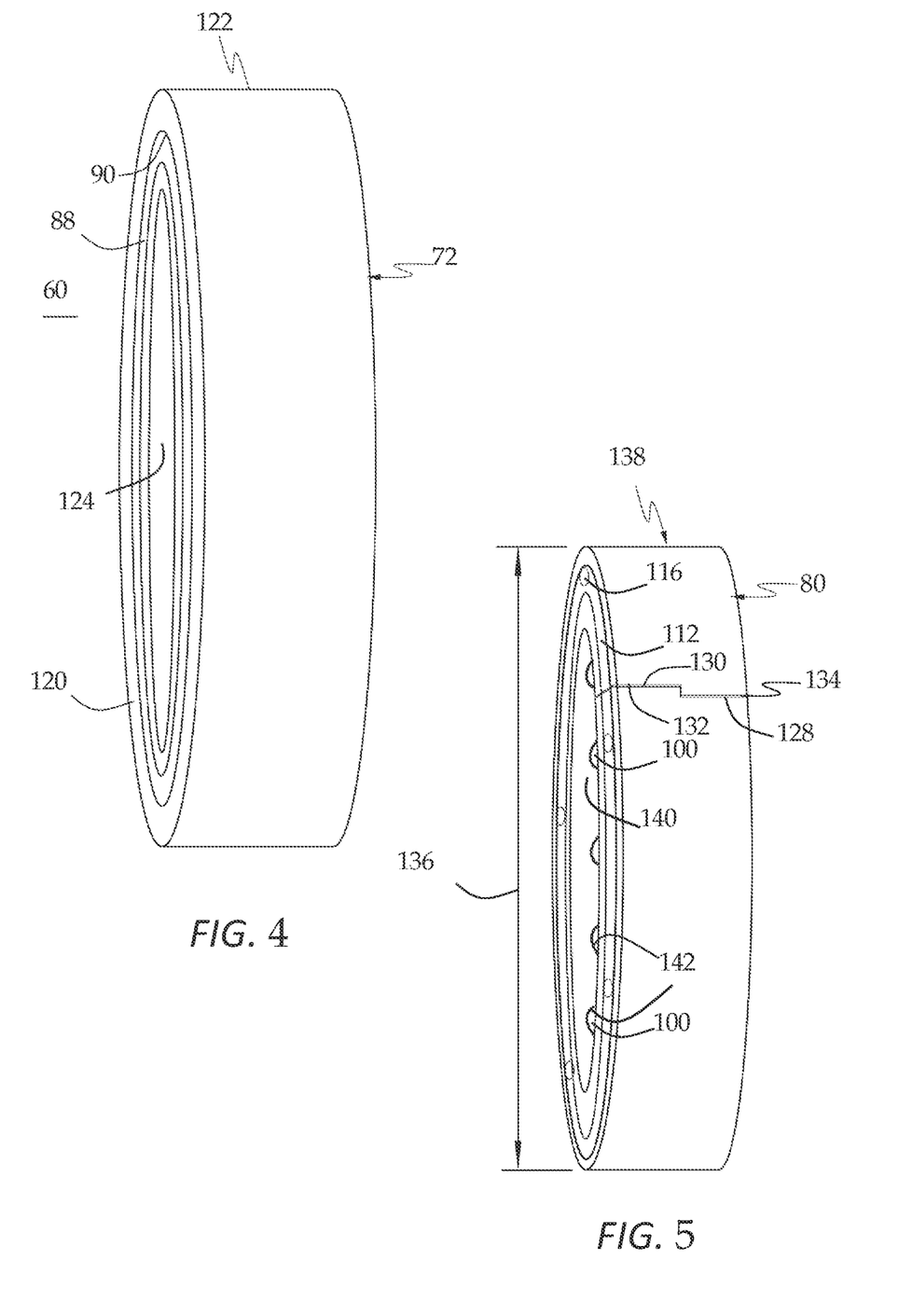
FIG. 4 is a perspective illustration of a part of the sealing system of FIG. 2, according to the exemplary embodiment.
FIG. 5 is a perspective illustration of a split ring of the sealing system of FIG. 2, according to the exemplary embodiment.

Referring to FIG. 4, the end plate 72 is illustrated showing its ring-like shape. The magnet ring 88 is contained in the annular groove 90. The magnet ring 88 is inserted through side 120 of the end plate 72, which faces the area 60. The end plate 72 includes an outer peripheral surface 122 that is spaced from the shaft 41 (FIG. 2), and an inner peripheral surface 124 sized to fit securely over the shaft 42 (FIG. 2). The end plate 74 and the magnet ring 92 are similarly constructed with the magnet ring 92 inserted through the side 126 (FIG. 2) of the end plate 74, which faces the area 62.

As shown in FIG. 5, the split ring 80 is illustrated removed from the seal assembly 58 for visibility. The split ring 80 is ring-like in shape with a split line 128 formed by ends 130, 132 of the split ring 80 that are separated by a gap 134. The split line 128 enables the split ring 80 to expand/contract/flex so that its outer diameter 136 may change in size in response to forces. For example, during rotation of the shaft 41 and/or the shaft 42, the split ring 80 will spin and centrifugal forces will cause the outer diameter 136 to grow, forcing the outer peripheral surface 138 against the shaft 41. During operation of the engine 20, under frictional force, relative motion is resisted by the friction between the shaft 41 and the split ring 80 so that the split ring 80 rotates with the shaft 41 relative to the end plates 72, 74.

The split ring 80 includes the annulus 112 with the openings 116 formed axially through the split ring at the annulus 112 and into the annulus 114 as visible in FIG. 2. The magnet(s) 100 are inserted into the inner peripheral surface 140. For example, a series of openings 142 may be formed as bores through the inner peripheral surface 140 or may otherwise be formed into the split ring 80 through the inner peripheral surface 140. The magnet(s) 100 may then be inserted into the openings 142 and secured therein.

Figure 6:
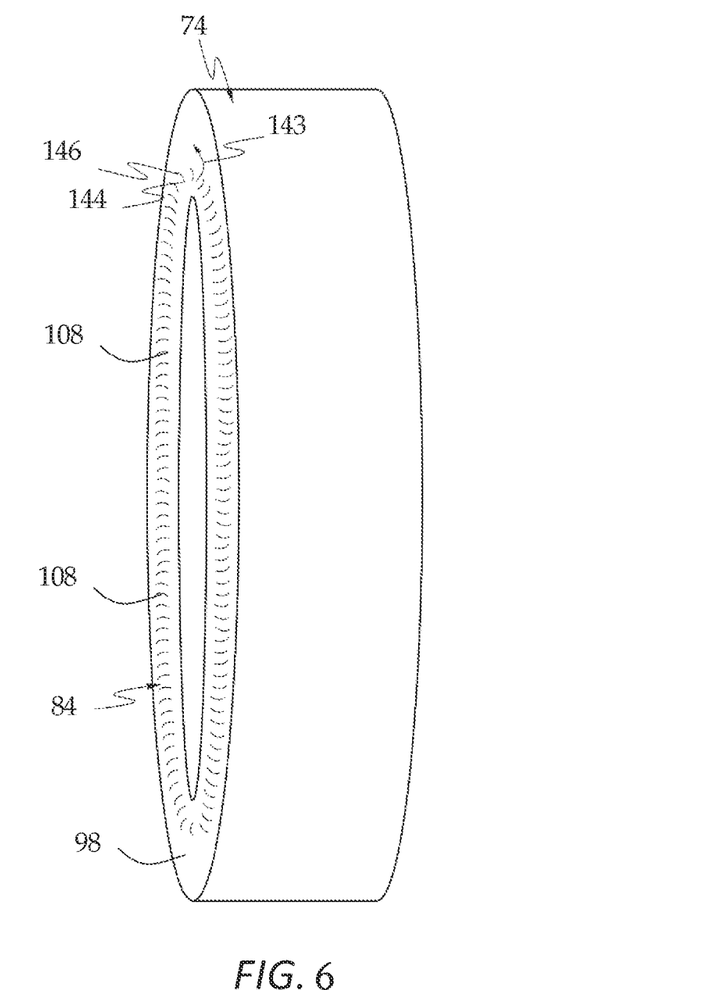
FIG. 6 is a perspective illustration of a part of the sealing system of FIG. 2, according to the exemplary embodiment.

The end plate 74 is illustrated in FIG. 6 removed from the seal assembly 58 for visibility, showing its ring-like shape and aspects of the hydrodynamic system 84. The grooves 108 are formed through the surface 98. In this embodiment, the grooves 108 are spiral shaped. For example, they may be spiral cut into the surface 98 to act as pumping elements. During relative rotation of the end plate 74, the grooves 108 move fluid in a radially outward flow 143 as a lower pressure is developed near the inboard ends 144 of the grooves 108, and a higher pressure is developed near the outboard ends 146 of the grooves 108.

Figure 7:
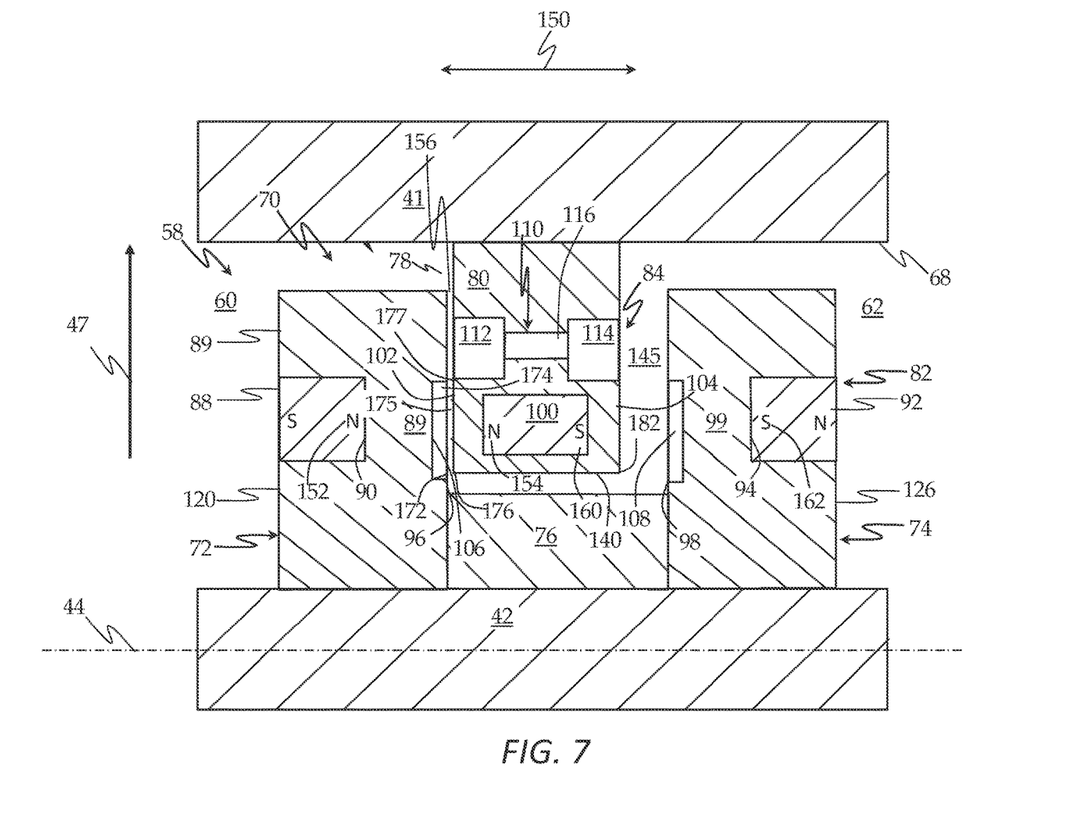
FIG. 7 is a schematic, cross-sectional illustration of the sealing system of FIG. 2 in a first loaded state effecting axial excursions, according to the exemplary embodiment.

As depicted in FIG. 7, axial excursions 150 of the shafts 41, 42 may occur during operation of the engine 20. In this example, the surface 102 of the split ring 80 approaches the surface 96 of the end plate 72. The magnetic system 82 and/or the hydrodynamic system 84 are configured to resist contact between the surfaces 96 and 102, including during the axial excursions 150. In operation, the magnetic system 82 operates to provide force to resist contact. The magnet ring 88 and the magnet(s) 100 include facing poles 152, 154, respectively, that have the same polarity. In this case the poles 152, 154 are both north poles and face each other across the space 156 between the surfaces 96, 102 tending to push the end plate 72 and the split ring 80 apart. It should be noted that the axial excursion 150 may be due to forces external to the seal assembly 58 and may be transient. The repulsive force between the magnet ring 88 and the magnet(s) 100 is continuous and the magnitude of the force is a factor of the proximity between the end ring 72 and the split ring 80. As a result, as the size of the space 156 closes, the force of repulsion increases. The magnet(s) 100 and the magnet ring 92 similarly repel one another. In this example, the south pole 160 of the magnet(s) 100 faces the south pole 162 of the magnet ring 92 across the space 145 between the split ring 80 and the end plate 74.

Figure 8:
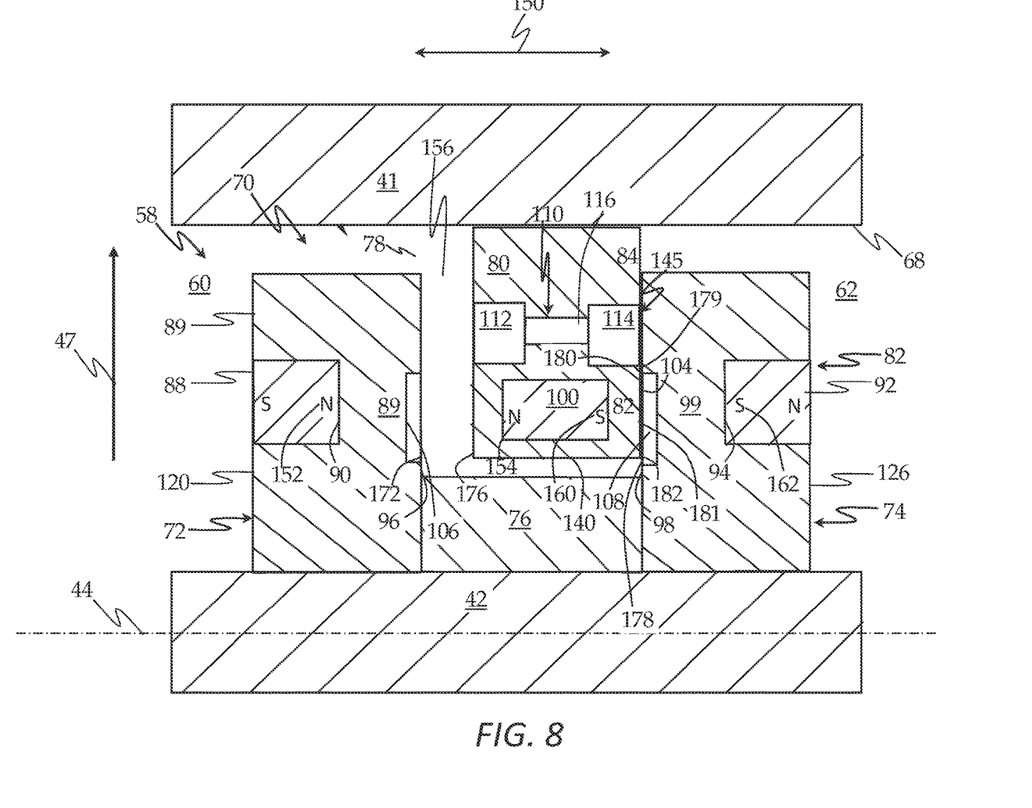
FIG. 8 is a schematic, cross-sectional illustration of the sealing system of FIG. 2 in a second loaded state effecting axial excursions, according to the exemplary embodiment.

Referring additionally to FIG. 8, when the axial excursions 150 may move the split ring 80 and the end plate 74 so that the surfaces 98, 104 approach each other, the magnitude of the repulsive force increases and contact between the surfaces 98, 104 is avoided or minimized. The effect of operation of the magnetic system 82 is to seek a balance to substantially center the split ring 80 in the gland opening 78. In this context, substantially centered means avoiding contact between the surfaces 96, 102 and between the surfaces 98, 104.

The hydrodynamic system 84 generally includes the grooves 106, 108, the annuli 112, 114 and the opening(s) 116. As the surfaces 96, 102 approach one another during an axial excursion 150 as shown in FIG. 7, the grooves 106 act to generate a pressurized fluid film in the space 156 generating a force that opposes contact between the surfaces 96, 102. The generated force increases as the surfaces 96, 102 become close and so the hydrodynamic force is highest as contact becomes incipient. The grooves 106 act to create a pumping action that flows fluid in the radial direction 47 (outward). A corner 176 of the split ring 80 is formed at the junction of the surface 102 and the inner peripheral surface 140. An inlet 172 is located at a radially inward position relative to the corner 176. A relatively low pressure is generated at the inlet 172 of the grooves 106 and a relatively high pressure is generated at the outlet 174 of the grooves 106. For example, when the space 156 is reduced to a few thousandths of a millimeter of film thickness, the hydrodynamic force is beneficially effective in inhibiting contact between the surfaces 96, 102.

The opening(s) 116 communicate pressure through the split ring 80 so that the pressures in the two annuli 112, 114 are balanced. The relatively high pressure generated at the outlet 174 of the grooves 106 due to the hydrodynamic pressure profile operates on a segment 175 of the surface 102 of the split ring 80 between the annulus 112 and the corner 176. In particular, the segment 175 includes a dam region 177 between the grooves 106 and the annulus 112. The grooves 106 pump fluid over the dam region 177 with resistance and into the annulus 112 with less resistance effectively generating force to resist contact between the surfaces 96, 102.

As the surfaces 98, 104 approach one another during an axial excursion 150 as shown in FIG. 8, the grooves 108 act to generate a pressurized fluid film in the space 145 generating a force that opposes contact between the surfaces 98, 104. The generated force increases as the surfaces 98, 104 become close and so the hydrodynamic force is highest as contact becomes incipient. The grooves 108 act to create a pumping action that flows fluid in the radial direction 47 (outward). An inlet 178 is located radially inward from the corner 182. A relatively low pressure is generated at the inlet 178 to the grooves 108 and a relatively high pressure is generated at the outlet 180 of the grooves 108. The opening(s) 116 communicate pressure through the split ring 80 so that the pressures in the annuli 112, 114 are balanced. The relatively high pressure generated at the outlet 180 of the grooves 108 due to the hydrodynamic pressure profile operates on a segment 181 of the surface 104 of the split ring 80 between the annulus 114 and the corner 182. In particular, the segment 181 includes a dam region 179 between the grooves 108 and the annulus 114. The grooves 108 pump fluid over the dam region 179 with resistance and into the annulus 114 with lower resistance effectively generating force to resist contact between the surfaces 98, 104.

The effect of the hydrodynamic system 84, such as in combination with those of the magnetic system 82, is effective in extending the service life of the engine 20 by minimizing heat generation and wear. While the magnetic system 82 operates to seek centering of the spilt ring 80 in the gland opening 78 and opposes contact with increasing force as the spaces 156, 145 become small, the hydrodynamic system 84 provides a boost as the spaces 156, 145 become very small.

The potential for the axial excursions 150 may be greater than the spacing between the split ring 80 and the end plates 72, 74 and so in the absence of the magnetic system 82 and/or the hydrodynamic system 84, repeated and/or sustained contact between the surfaces 96, 102 or the surfaces 98, 104 may lead to heat generation and wear that reduces service life. The axial excursions 150, if unopposed, may be of a magnitude, such as 2-5 millimeters in this example. The design size of the spaces 156, 145 may be fractions of a single millimeter. Accordingly, the magnetic system 82 and/or the hydrodynamic system 84 provide mechanisms to reduce the axial excursions 150, while inhibiting surface contacts.

Accordingly, an intershaft seal system with a seal assembly 58 provides noncontacting operation to reduce heat generation and wear. Pressure loading capability is increased. For example, the pressure differential between the areas 60, 62 on opposite sides of the seal assembly 58 is a function of the operational state of the engine 20. Extending the operational range of the engine 20 would otherwise be limited by contact heat generation and wear if not for the added features of the seal assembly 58. Contact related outcomes are eliminated or reduced by means of magnetic force and/or hydrodynamic effects. By eliminating contact during translations and higher differential pressures, service life may be significantly extended. In the event contact does occur, the resulting heat and parasitic loss is minimized. The seal assembly 58 enables operating speeds and pressures above otherwise realistic maximums.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A sealing system comprising:
   an outer shaft having a hollow interior;
   an inner shaft extending through the hollow interior of the outer shaft;
   a first plate encircling the inner shaft and configured to rotate with the inner shaft;
   a second plate encircling the inner shaft and configured to rotate with the inner shaft, the second plate axially spaced from the first plate so that a gland opening is defined between the inner and outer shafts and between the first and second plates; and
   a ring disposed in the gland opening,
   the first plate including a first force generating element configured to generate a first force to separate the ring from the first plate,
   the second plate including a second force generating element configured to generate a second force to separate the ring from the second plate,
   wherein the first and second force generating elements comprise at least one of magnets and hydrodynamic grooves.

2. The sealing system of claim 1, wherein the first force generating element comprises the first hydrodynamic grooves and the second force generating element comprises the second hydrodynamic grooves.

3. The sealing system of claim 1, wherein the first force generating element comprises a first magnet ring with a first series of magnets and the second force generating element comprises a second magnet ring with a second set of magnets.

4. The sealing system of claim 1, wherein the first and second force generating elements comprise the first and second hydrodynamic grooves, respectively, and comprising a force balancing opening through the ring.

5. The sealing system of claim 1, wherein the ring is split and is configured to expand against the outer shaft to rotate therewith in response to a rotationally generated force.

6. The system of claim 1, wherein the ring includes a force balancing opening configured to assist the first and second forces in maintaining the ring in a substantially centered disposition between the first and second plates.

7. The sealing system of claim 1, further comprising magnets, wherein the ring includes an inner peripheral surface with a number of bores, each of the bores containing one of the magnets.

8. The sealing system of claim 1, wherein the ring includes a first surface facing the first plate and a second surface facing the second plate, wherein a first annulus is formed through the first surface and a second annulus is formed through the second surface and comprising a number of openings that extend through the ring from the first annulus to the second annulus.

9. The sealing system of claim 8, wherein:
   the at least one of magnets and hydrodynamic grooves comprise first grooves and second grooves,
   the ring has an inner peripheral surface facing the inner shaft,
   the first plate includes the first grooves having first inlets disposed further radially inward than the inner peripheral surface and having first outlets disposed radially outward from the first inlets and further radially inward than the first annulus, and
   the second plate includes the second grooves having second inlets disposed further radially inward than the inner peripheral surface and having second outlets disposed further radially outward than the second inlets and further radially inward than the second annulus.

10. The sealing system of claim 9, comprising a corner between the first surface and the inner peripheral surface, wherein the first surface includes a dam region adjacent the first annulus, wherein the first grooves are configured to generate a pressure on a segment of the first surface of the ring, the segment disposed between the first annulus and the corner, wherein the segment includes the dam region, wherein the dam region is configured to resist fluid flow into the first annulus.

11. A sealing system comprising:
    an outer shaft having a hollow interior;
    an inner shaft extending through the hollow interior of the outer shaft;
    a first end plate encircling the inner shaft and configured to rotate with the inner shaft within the hollow interior;
    a second end plate encircling the inner shaft and configured to rotate with the inner shaft within the hollow interior;
    a spacer encircling the inner shaft and axially spacing the second end plate from the first end plate, with a gland opening defined between the inner and outer shafts and between the first and second end plates; and
    a split ring disposed in the gland opening, the split ring configured to expand to engage and rotate with the outer shaft,
    wherein the first end plate includes a first force generating element configured to generate a first force acting to separate the split ring from the first end plate,
    wherein the second end plate includes a second force generating element configured to generate a second force acting to separate the split ring from the second end plate,
    wherein the first and second force generating elements comprise a combination of magnets and hydrodynamic grooves.

12. The sealing system of claim 11, wherein the hydrodynamic grooves are formed in the first and second end plates.

13. The sealing system of claim 11, comprising first and second magnet rings containing the magnets, and comprising a series of magnets disposed in the split ring, the series of magnets configured to repel both of the magnet rings.

14. The sealing system of claim 11, comprising a force balancing opening extending through the split ring.

15. The system of claim 11, wherein the split ring includes a force balancing opening configured to assist the first and second forces to maintain the split ring in a substantially centered disposition between the first and second plates.

16. The sealing system of claim 11, wherein the split ring includes an inner peripheral surface with a number of bores, each of the number of bores containing one of the magnets.

17. The sealing system of claim 11, wherein the split ring includes a first surface facing the first end plate and a second surface facing the second end plate, wherein a first annulus is formed through the first surface and a second annulus is formed through the second surface, wherein a number of openings extend through the split ring from the first annulus to the second annulus.

18. The sealing system of claim 17, wherein the hydrodynamic grooves include a first set of grooves and a second set of grooves, wherein:
    the split ring has an inner peripheral surface facing the inner shaft,
    the first end plate includes the first set of grooves, which have first inlets disposed further radially inward than the inner peripheral surface, and the first set of grooves having first outlets disposed further radially outward than the first inlets and further radially inward than the first annulus, and the second plate includes the second set of grooves, which have second inlets disposed further radially inward than the inner peripheral surface, and the second set of grooves having second outlets disposed further radially outward than the second inlets and further radially inward than the second annulus.

19. The sealing system of claim 18, comprising a corner formed between the first surface and the inner peripheral surface, wherein the first set of grooves is configured to generate a pressure on a segment of the first surface of the split ring, the segment disposed between the first annulus and the first corner.

20. A sealing system comprising:
an outer shaft having a hollow interior;
an inner shaft extending through the hollow interior of the outer shaft, the inner and the outer shafts configured to rotate relative to one another;
a first end plate encircling the inner shaft and configured to rotate with the inner shaft within the hollow interior;
a second end plate encircling the inner shaft and configured to rotate with the inner shaft within the hollow interior;
a spacer encircling the inner shaft and axially spacing the second end plate from the first plate, with a gland opening is defined between the inner and outer shafts and between the first and second end plates; and
a split ring disposed in the gland opening, the split ring configured to expand in response to rotationally generated forces to engage and rotate with the outer shaft,
wherein the split ring is not fixed to the outer shaft,
wherein the first end plate includes a first force generating magnet configured to generate a first force acting to separate the split ring from the first end plate,
wherein the second end plate includes a second force generating magnet configured to generate a second force acting to separate the split ring from the second plate,
wherein the split ring includes a series of magnets configured to repel both the first force generating magnet and the second force generating magnet,
wherein the split ring comprises a low friction material disposed between the series of magnets and the first end plate and between the series of magnets and the second end plate,
wherein the first end plate comprises a section of material between the first force generating magnet and the split ring,
wherein the second end plate comprises a section of material between the second force generating magnet and the split ring.

* * * * *